United States Patent
Uchimura et al.

(10) Patent No.: US 12,205,384 B2
(45) Date of Patent: Jan. 21, 2025

(54) PROCESSING APPARATUS, PROCESSING METHOD, AND NON-TRANSITORY STORAGE MEDIUM

(71) Applicant: NEC Corporation, Tokyo (JP)

(72) Inventors: Jun Uchimura, Tokyo (JP); Yuji Tahara, Tokyo (JP); Rina Tomita, Tokyo (JP); Yasuyo Kazo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 163 days.

(21) Appl. No.: 17/800,613

(22) PCT Filed: Feb. 10, 2021

(86) PCT No.: PCT/JP2021/004975
§ 371 (c)(1),
(2) Date: Aug. 18, 2022

(87) PCT Pub. No.: WO2021/181990
PCT Pub. Date: Sep. 16, 2021

(65) Prior Publication Data
US 2023/0070529 A1    Mar. 9, 2023

(30) Foreign Application Priority Data
Mar. 13, 2020  (JP) .................. 2020-044091

(51) Int. Cl.
*H01L 29/94* (2006.01)
*G06Q 10/087* (2023.01)
*G06V 20/40* (2022.01)
*G06V 20/52* (2022.01)
*G06V 20/64* (2022.01)

(52) U.S. Cl.
CPC ........... *G06V 20/64* (2022.01); *G06Q 10/087* (2013.01); *G06V 20/52* (2022.01); *G06V 20/44* (2022.01); *G06V 2201/07* (2022.01)

(58) Field of Classification Search
CPC ........ G06V 20/64; G06V 20/52; G06V 20/44; G06V 2201/07; G06Q 10/087; G06Q 30/06; H04N 7/18
See application file for complete search history.

(56) References Cited

U.S. PATENT DOCUMENTS

| | | | | |
|---|---|---|---|---|
| 10,258,306 B2* | 4/2019 | Jouhikainen | ............. | A61B 6/51 |
| 10,311,760 B1* | 6/2019 | McMahon | ........... | C09D 11/328 |
| 10,783,410 B1* | 9/2020 | Hullander | .............. | G06V 20/52 |
| 11,828,874 B2* | 11/2023 | Okuni | ..................... | G01S 17/10 |
| 2003/0108099 A1* | 6/2003 | Nagumo | ................... | G06T 9/20 |
| | | | | 375/E7.199 |
| 2004/0062443 A1* | 4/2004 | Yen | ...................... | G06K 7/1443 |
| | | | | 382/209 |

(Continued)

*Primary Examiner* — Joseph Suh

(57) ABSTRACT

A processing apparatus includes at least one memory storing one or more instructions and at least one processor. The at least one processor is configured to execute the one or more instructions to acquire an image of a management target, where the image includes an object. The at least one processor is configured to execute the one or more instructions to further determine, based on layout information indicating locations of pieces of equipment installed in the management target and indicating a location of a marker installed in the management target, to which of the pieces of equipment the object included in the image is equivalent.

10 Claims, 11 Drawing Sheets

(56) References Cited

U.S. PATENT DOCUMENTS

| | | | |
|---|---|---|---|
| 2016/0014382 A1* | 1/2016 | Maruta | H04N 7/18 |
| | | | 348/143 |
| 2016/0147376 A1* | 5/2016 | Kim | G06F 3/04186 |
| | | | 345/175 |
| 2016/0379367 A1* | 12/2016 | Yasunaga | G06Q 10/087 |
| | | | 382/103 |
| 2018/0057262 A1* | 3/2018 | Mitsuyu | H04N 7/188 |
| 2018/0147724 A1* | 5/2018 | Oaki | B25J 9/1638 |
| 2019/0188435 A1* | 6/2019 | Davis | G06V 10/10 |
| 2019/0188734 A1* | 6/2019 | Nagai | G06Q 30/0201 |
| 2019/0230233 A1* | 7/2019 | Oya | G06V 30/1463 |
| 2020/0167701 A1* | 5/2020 | Debono | G06V 40/103 |
| 2020/0191927 A1* | 6/2020 | Lin | G01S 7/497 |
| 2020/0223634 A1* | 7/2020 | Arase | B25J 19/021 |
| 2021/0097478 A1* | 4/2021 | Yang | G06V 20/20 |
| 2021/0398260 A1* | 12/2021 | Naohara | B05C 11/00 |
| 2022/0229764 A1* | 7/2022 | Zhai | G06F 18/214 |

* cited by examiner

FIG. 8

| CAMERA IDENTIFICATION INFORMATION | EQUIPMENT INFORMATION |
|---|---|
| 01 | PRODUCT SHELF 01: {($X_{11}$, $Y_{11}$), ···}<br>PRODUCT SHELF 07: {($X_{71}$, $Y_{71}$), ···}<br>CHECKOUT COUNTER: {($X_{r1}$, $Y_{r1}$), ···} |
| ⋮ | ⋮ |

PROCESSING APPARATUS, PROCESSING METHOD, AND NON-TRANSITORY STORAGE MEDIUM

This application is a National Stage Entry of PCT/JP2021/004975 filed on Feb. 10, 2021, which is based upon and claims the benefit of priority from Japanese patent application No. 2020-044091 filed on Mar. 13, 2020, the disclosure of which is incorporated herein in its entirety by reference.

TECHNICAL FIELD

The present invention relates to a processing apparatus, a processing method, and a program.

BACKGROUND ART

Patent Document 1 discloses a technique of associating, based on a location of a marker assigned to a floor of a store and a location of a marker in an image, a location (coordinates) on a map of the store with a location (coordinates) in the image.

Patent Document 2 discloses a technique of setting a target area on a facility map image in which an internal layout of a facility is depicted.

RELATED DOCUMENT

Patent Document

[Patent Document 1] Japanese Patent Application Publication No. 2016-149654

[Patent Document 2] Japanese Patent Application Publication No. 2017-182654

DISCLOSURE OF THE INVENTION

Technical Problem

Inventors of the present invention have examined a technique for surveying a status of store equipment by using an image generated by a camera (a surveillance camera and the like) installed in a store. An example of a surveillance content includes, but is not limited to, surveillance of a status (whether stockout is present, whether a foreign object is present, and the like) of a product shelf, and the like. Then, as a result of examining the technique, the inventors have newly found the following problem.

In order to perform equipment surveillance as described above, it is necessary to determine which piece of the equipment is included in an image generated by each camera. When the determination is not performed, even when a predetermined event (stockout, presence of a foreign object, and the like) is detected by using an image analysis, it is unclear at which piece of the equipment the event occurs. In a case of a method in which a person views images, determines a piece of equipment included in each of the images, and inputs a content of the determination, a burden on the person increases. Patent Documents 1 and 2 do not disclose the problem and a solution to the problem.

An object of the present invention is to provide a technique for determining a piece of equipment included in an image generated by a camera (a surveillance camera and the like) installed in a store.

Solution to Problem

According to the present invention, a processing apparatus including:
an acquisition unit that acquires image of a management target; and
a determination unit that determines, by using layout information of equipment in the management target, a piece of the equipment included in the image is provided.

Further, according to the present invention, a processing method including,
by a computer:
acquiring an image of a management target; and
determining, by using layout information of equipment in the management target, a piece of the equipment included in the image is provided.

Further, according to the present invention, a program causing a computer to function as:
an acquisition unit that acquires an image of a management target; and
a determination unit that determines, by using layout information of equipment in the management target, a piece of the equipment included in the image is provided.

Advantageous Effects of Invention

According to the present invention, a technique for determining a piece of equipment included in an image generated by a camera (a surveillance camera and the like) installed in a store is achieved.

BRIEF DESCRIPTION OF THE DRAWINGS

FIG. 8 is a diagram schematically illustrating one example of information to be processed by the processing apparatus according to the present example embodiment.

DESCRIPTION OF EMBODIMENTS

First Example Embodiment

Upon acquiring an image of a management target generated by a camera (a surveillance camera and the like) installed in the management target (a store and the like), a processing apparatus according to the present example embodiment determines, by using layout information of equipment in the management target, a piece of the equipment included in the image. In the following, a configuration of the processing apparatus is described in detail.

First, one example of a hardware configuration of the processing apparatus is described. A functional unit included in the processing apparatus according to the present example embodiment is achieved using any combination of hardware and software, mainly including a central processing unit (CPU) of any computer, a memory, a program to be loaded onto the memory, a storage unit such as a hard disk (capable of storing a program stored in advance from a stage of shipping an apparatus, as well as a program downloaded from a storage medium such as a compact disc (CD), a server on the Internet, and like) storing the program, and an interface for network connection. Further, a person skilled in the art understands that there are various modification examples of a method and an apparatus for achieving the functional unit.

Figure 1:
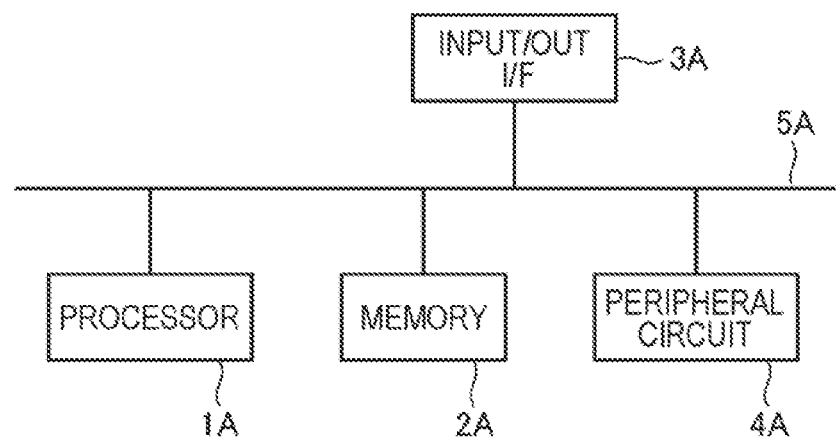
FIG. 1 is a diagram illustrating one example of a hardware configuration of a processing apparatus according to the present example embodiment.

FIG. 1 is a block diagram illustrating the hardware configuration of the processing apparatus according to the present example embodiment. As illustrated in FIG. 1, the processing apparatus includes a processor 1A, a memory 2A, an input/output interface 3A, a peripheral circuit 4A, and a bus 5A. The peripheral circuit 4A includes various modules. Note that, the processing apparatus may not include the peripheral circuit 4A. Note that, the processing apparatus may be configured of a single apparatus that is physically and/or logically integrated, or may be configured of a plurality of apparatuses that are physically and/or logically separated. When the processing apparatus is configured of a plurality of apparatuses that are physically and/or logically separated, each of the plurality of apparatuses may include the above-described hardware configuration.

The bus 5A is a data transmission path for the processor 1A, the memory 2A, the peripheral circuit 4A, and the input/output interface 3A to mutually transmit and receive data. The processor 1A is, for example, an arithmetic processing apparatus such as a CPU or a graphics processing unit (GPU). The memory 2A is, for example, a memory such as a random access memory (RAM) or a read only memory (ROM). The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a touch panel, a physical button, a camera, and the like. The output apparatus is, for example, a display, a speaker, a printer, a mailer, and the like. The processor 1A is capable of issuing an instruction to each module and performing an arithmetic operation, based on a result of arithmetic operation by each module.

Figure 2:
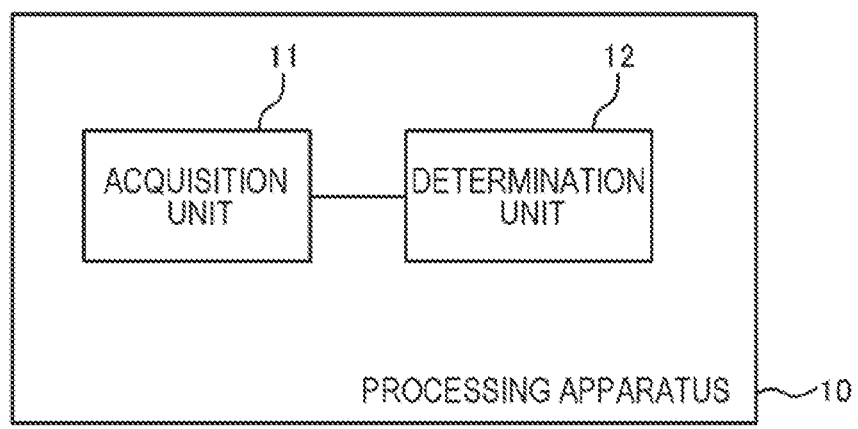
FIG. 2 is one example of a function block diagram of the processing apparatus according to the present example embodiment.

Next, a functional configuration of the processing apparatus is described. FIG. 2 illustrates one example of a function block diagram of a processing apparatus 10. As illustrated, the processing apparatus 10 includes an acquisition unit 11 and a determination unit 12. Note that, the processing apparatus 10 may be an apparatus that is installed in each management target (specifically, in each store, and the like) and that manages each management target. Otherwise, the processing apparatus 10 may be a server that is installed in a center and the like and that manages a plurality of management targets.

The acquisition unit 11 acquires an image of a management target. A plurality of pieces of equipment, which are targets of detecting a predetermined event by an image analysis, are installed in the management target. In the present example embodiment, the management target is a store. Further, the piece of equipment is, for example, a product shelf, a counter, an aisle, a copying machine, a chair and a table in an eat-in space, a parking lot, or the like. Further, the predetermined event is stockout, presence of a foreign object, and the like. Note that, the management target, the equipment, and the predetermined event exemplified herein are each merely one example, and are not limited thereto. For example, the management target may be a warehouse, an office, or the like. Further, the predetermined event may be another event that can be detected from an image.

A camera for capturing the management target is installed in the management target. An image generated by the camera includes the equipment installed in the management target. The acquisition unit 11 acquires an image generated by the camera. Note that, a plurality of cameras may be installed in the management target. Further the acquisition unit 11 may acquire an image generated by each of the plurality of cameras.

Although a camera is assumed to be continuously generating a moving image, otherwise, the camera may generate a still image at a predetermined timing. Further, the camera may include a fisheye lens, or may include a standard lens (for example, with an angle of view from approximately 40° to approximately 60°).

Note that, in the present description, "acquisition" may include "retrieving data stored in another apparatus or a storage medium by an own apparatus (active acquisition)", based on a user input or based on a program instruction, for example, receiving data by making a request or query to another apparatus, reading data by accessing another apparatus or a storage medium, and the like. Further, "acquisition" may also include "inputting data output from another apparatus to an own apparatus (passive acquisition)", based on a user input or based on a program instruction, for example, receiving data being distributed (or transmitted, notified by a push notification, or the like), and the like. Furthermore, "acquisition" may include selecting and acquiring from received data or information, and "generating new data by editing data (converting the data into text, reordering the data, extracting some pieces of the data, changing a file format, and the like) and the like, and acquiring the new data".

The determination unit 12 determines, by using layout information of the equipment in the management target, a piece of the equipment included in an image.

Figure 4:
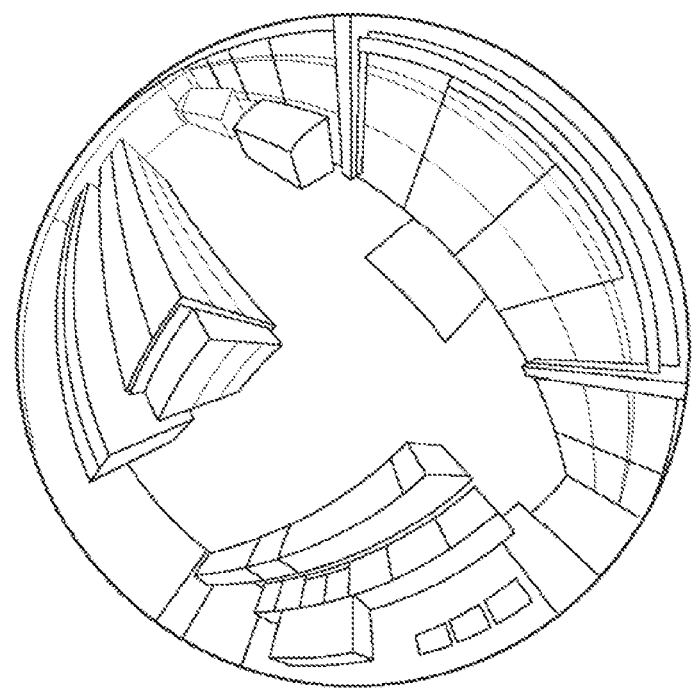
FIG. 4 is a diagram schematically illustrating one example of information to be processed by the processing apparatus according to the present example embodiment.

An image to be processed by the determination unit 12 may be an image captured with the standard lens, an image captured with the fisheye lens (see FIG. 4), or an image developed, into a plane, an image captured with the fisheye lens (see FIG. 4).

Figure 3:
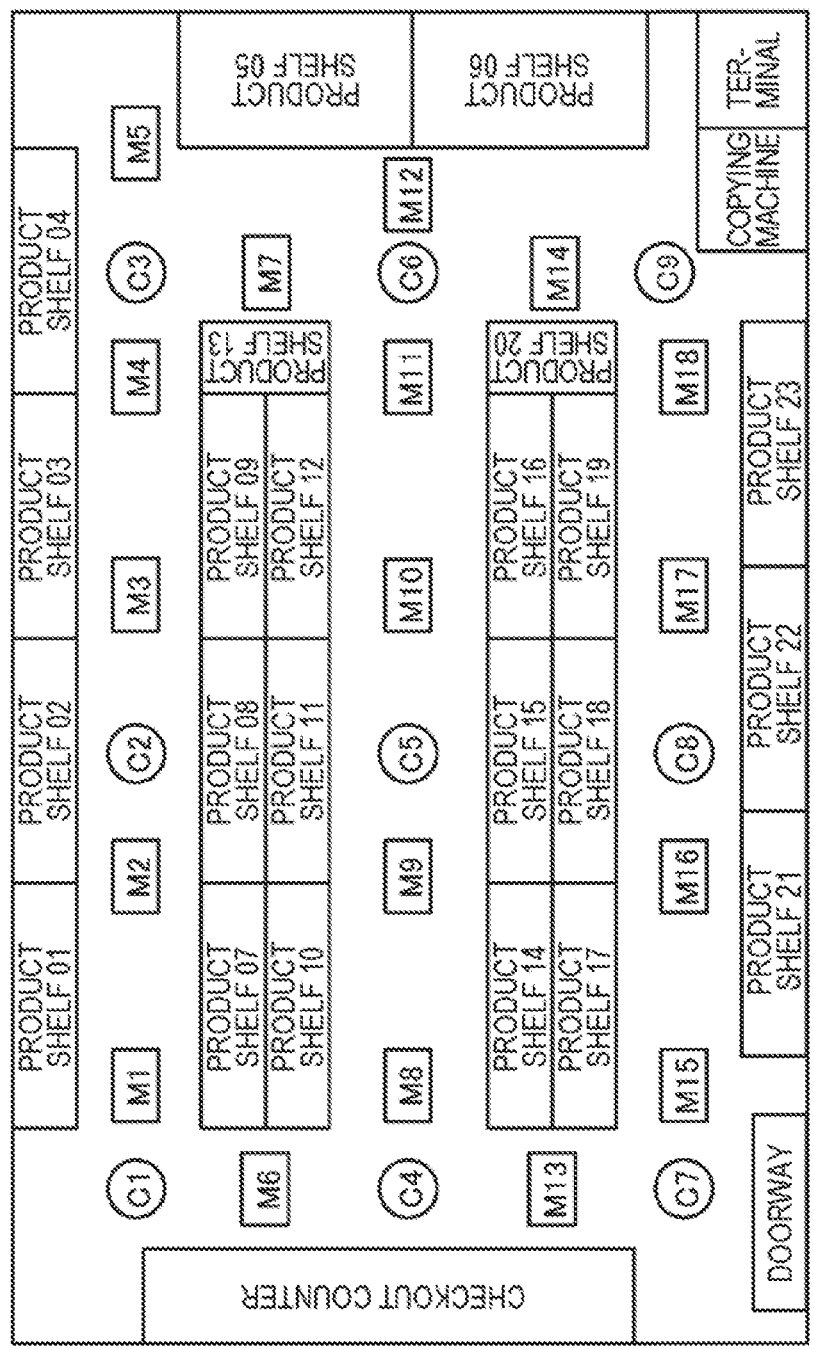
FIG. 3 is a diagram schematically illustrating one example of information to be processed by the processing apparatus according to the present example embodiment.

One example of the layout information is schematically illustrated in FIG. 3. The layout information being illustrated indicates locations where pieces of the equipment (product shelves, a checkout counter, a copying machine, and a terminal) are installed in the management target. Further, the layout information being illustrated indicates, with reference signs C1 to C9, a location where each of nine cameras is installed. Further, the layout information being illustrated indicates, with reference signs M1 to M18, a location where each of 18 markers is installed in the management target.

Herein, one example of processing of determining a piece of equipment included in an image by using the layout information is described.

First, the determination unit 12 extracts, from an image being a processing target, a marker installed in the management target. A feature value of an appearance of each of a plurality of markers is registered in advance, and the determination unit 12 extracts each of the markers from the image, based on the feature value. Note that, appearances of the plurality of markers are different from each other, and each of the plurality of markers can be identified from each other, based on the appearance.

Further, the determination unit 12 extracts an object from the image being the processing target. Since an object extraction technique is widely known, description thereof is omitted herein.

Then, the determination unit 12 determines, based on relative positional relation between the extracted marker and the extracted object, which piece of the equipment the extracted object is equivalent to. For example, it is considered that the product shelves 10, 11, 14 and 15, the markers M8 and M9, and the like are included in an image generated by the camera C4 illustrated in FIG. 3. According to FIG. 3, the marker M9 is installed near a border between the product shelves 10 and 11 and near a border between the product shelves 14 and 15. Further, the product shelves 10 and 11 are installed on the same side across an aisle, and the product shelves 14 and 15 are installed on the same side across the aisle. Furthermore, the product shelves 10 and 11 and the product shelves 14 and 15 are installed on opposite sides across the aisle. Further, the markers M8 and M9 are installed in the aisle. Furthermore, the camera C4 is installed closer to the product shelf 10 than the product shelf 11, and closer to the product shelf 14 than the product shelf 15.

In this case, for example, it is possible to identify the product shelves 10 and 14, and the product shelves 11 and 15, based on whether the product shelf is located closer to or farther from the camera than the marker M9. Further, for example, it is possible to identify the product shelf 10 and the product shelf 14 and to identify the product shelf 11 and the product shelf 15, based on whether the product shelf is located to a right side or a left side of a line connecting the marker M8 and the marker M9 as viewed from the camera. Therefore, for example, the determination unit 12 can determine which product shelf a plurality of objects extracted from the image generated by the camera C4 is equivalent to, based on analysis results as to whether the plurality of objects extracted from the image generated by the camera C4 is located closer to the camera than the marker M9 is, whether each of the plurality of objects is located to the right side or the left side of the line connecting the marker M8 and the marker M9 as viewed from the camera, and the like.

As another example, the determination 12 may associate, based on a marker included in an image, store coordinates defined in the layout information such as illustrated in FIG. 3 with coordinates on the image. By this association relation, the determination unit 12 can convert the store coordinates in the layout information into the coordinates on the image. Therefore, the determination unit 12 may determine, by converting location coordinates of each piece of the equipment indicated in the layout information into coordinates on the image, a piece of the equipment included in the image, as well as determine a location of each piece of the equipment in the image.

As another example, a marker for identifying each piece of equipment may be attached to each of the plurality of pieces of the equipment. Further, the determination unit 12 may determine, based on a marker attached to an object extracted from an image, which piece of the equipment the object extracted from the image is.

Otherwise, instead of installing a specific marker in the management target, a piece of equipment in the management target may be used as a marker.

Note that, an algorithm described herein is merely one example, and is not limited thereto.

By such processing performing by the determination unit 12, a piece of the equipment included in an image is determined. Further, a location (an occupied area) of the piece of the equipment in the image is determined. Furthermore, when the acquisition unit 11 acquires images generated by each of a plurality of cameras, a piece of the equipment included in each image generated by each of the plurality of cameras is determined, and a location (an occupied area) of the piece of the equipment in each of the images is determined.

Figure 5:
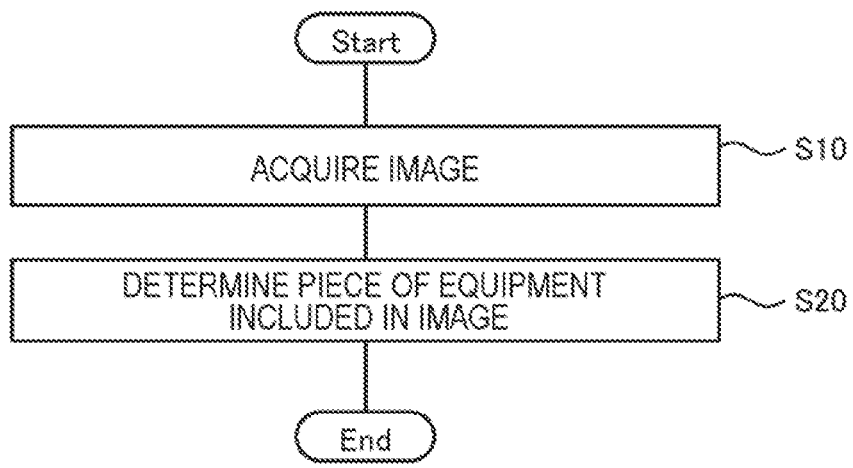
FIG. 5 is a flowchart illustrating one example of a flow of processing by the processing apparatus according to the present example embodiment.

Next, one example of a flow of processing by the processing apparatus 10 is described by using a flowchart in FIG. 5. When the acquisition unit 11 acquires an image of a management target (S10), the determination unit 12 determines, by using layout information (see FIG. 3) of equipment in the management target, a piece of the equipment included in the image (S20).

Figure 6:
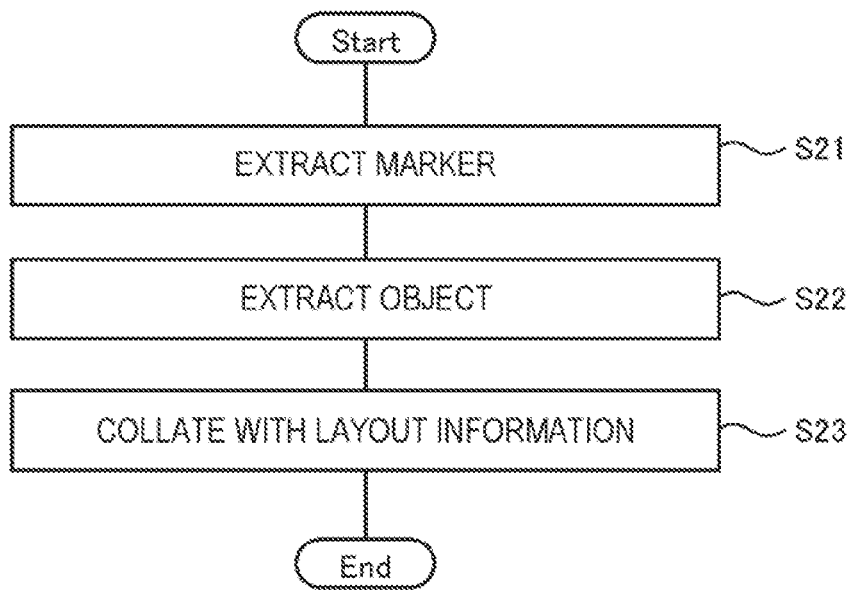
FIG. 6 is a flowchart illustrating one example of a flow of processing by the processing apparatus according to the present example embodiment.

One example of a flow of processing in S20 is described by using a flowchart in FIG. 6. The determination unit 12 extracts a marker from an image, based on a pre-registered feature value of each of a plurality of markers (S21). Further, the determination unit 12 extracts an object from the image, by using any object detection technique (S22). Note that, a processing order of S21 and S22 is not limited to that as illustrated.

After that, the determination unit 12 collates relative positional relation between the extracted object and the extracted marker with the layout information, and determines which piece of the equipment indicated in the layout information each of the extracted objects is (S23).

According to the processing apparatus 10 according to the present example embodiment described above, a piece of equipment included in an image of a management target is determined based on layout information of the equipment in the management target. Further, according to the processing apparatus 10, a location (an occupied area) of the piece of the equipment in the image of the management target is determined. Further, according to the processing apparatus 10, a piece of equipment included in each image generated by each of a plurality of cameras is determined. Furthermore, according to the processing apparatus 10, a location (an occupied area) of the piece of the equipment in each image generated by each of the plurality of cameras is determined. According to the processing apparatus 10, since it is not required that a person views an image, determines a piece of equipment included in each of the images, and inputs a content of the determination, a burden on the person is reduced.

Second Example Embodiment

Figure 7:
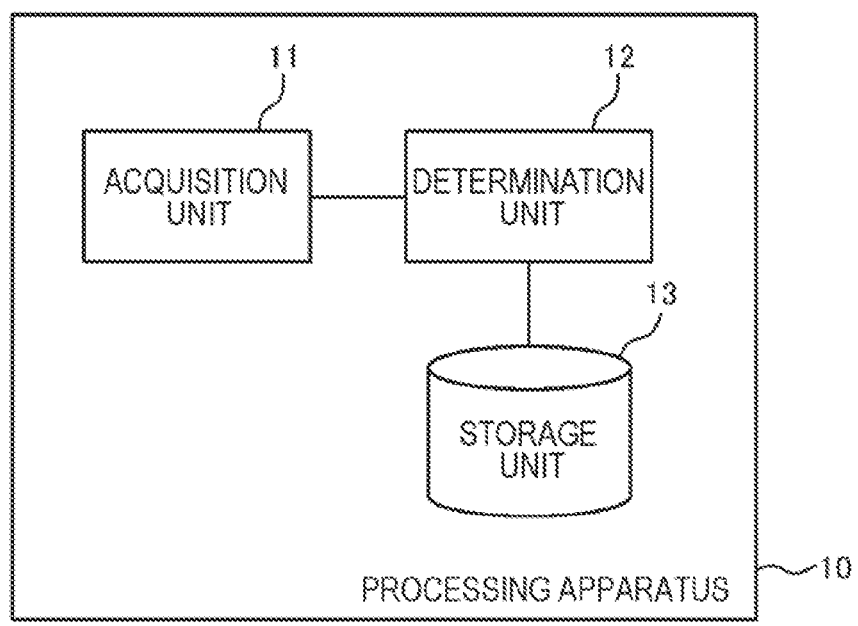
FIG. 7 is one example of a function block diagram of the processing apparatus according to the present example embodiment.

FIG. 7 illustrates one example of a function block diagram of a processing apparatus 10 according to the present example embodiment. As illustrated, the processing apparatus 10 includes an acquisition unit 11, determination unit 12, and a storage unit 13.

The determination unit 12 causes the storage unit 13 to store information for identifying a camera, information for identifying a piece of equipment being determined to be included in an image generated by each camera, and information indicating a location of the piece of equipment in the image, in association with one another.

One example of information stored in the storage unit 13 is schematically illustrated in FIG. 8. In the example being illustrated, camera identification information and equipment information are associated with each other. The equipment information being illustrated includes information for identifying a piece of equipment included in an image generated by each camera, and a location (an occupied area) of each piece of the equipment in the image. In a case of the example being illustrated, a location (an occupied area) of each piece of the equipment in an image is indicated with coordinates of a point on an outline of each piece of the equipment in the image, however, a method of indicating the location is not limited thereto.

Other configurations of the processing apparatus 10 are similar to those in the first example embodiment.

According to the processing apparatus 10 according to the present example embodiment described above, an advantageous effect similar to that of the first example embodiment is achieved. Further, according to the processing apparatus 10 according to the present example embodiment, it is also possible to generate a database (see FIG. 8) including information for identifying a piece of equipment included in an image generated by each of a plurality of cameras installed in a management target, and information indicating a location (an occupied area) of each piece of the equipment in the image. By referring to this database, a piece of the equipment included in the image generated by each of the plurality of cameras installed in the management target can be easily recognized. Further, a location (an occupied area) of each piece of the equipment in the image generated by each of the plurality of cameras can be easily recognized.

Third Example Embodiment

Figure 9:
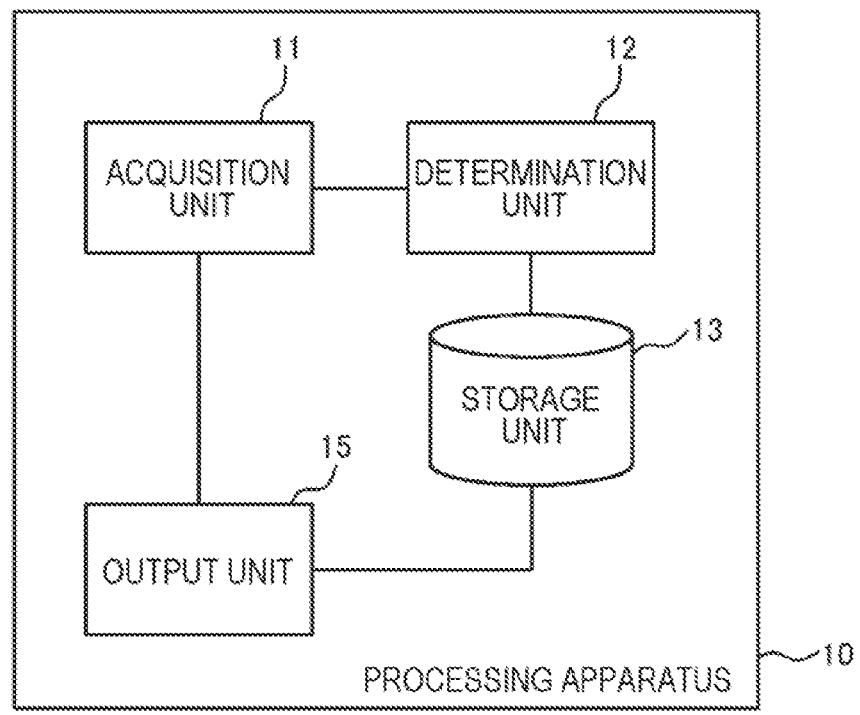
FIG. 9 is one example of a function block diagram of the processing apparatus according to the present example embodiment.

A processing apparatus 10 according to the present example embodiment executes various types of processing, based on a database generated by the processing apparatus 10 according to the second example embodiment. One example of a function block diagram of the processing apparatus 10 according to the present example embodiment is illustrated in FIG. 9. As illustrated, the processing apparatus 10 includes an acquisition unit 11, a determination unit 12, a storage unit 13, and an output unit 15.

The output unit 15 outputs images generated by a plurality of cameras to a display. For example, the output unit 15 can output the images generated by the plurality of cameras to the display while switching the images one by one in sequence. Further, when one piece of equipment is specified based on a user input, the output unit 15 can determine, based on a database generated by the determination unit 12 such as illustrated in FIG. 8, a camera that generates an image including the specified piece of the equipment, and output images generated by the determined camera while switching the images one by one in sequence.

For example, it is assumed that a "product shelf 01" is specified based on a user input, and that a "camera C1", a "camera C2", and a "camera C4" are determined, based on a database such as illustrated in FIG. 8, as cameras that generate images including the specified equipment "product shelf 01". In this case, output unit 15 outputs only images generated by the "camera C1", the "camera C2" and the "camera C4", which are part of the plurality of cameras, to a display, while switching the images one by one in sequence. For example, the output unit 15 may output, based on a user input, the images generated by the "camera C1", the "camera C2", and the "camera C4" to the display, while switching the images one by one in sequence.

Note that, there are various method for a user to specify a piece of equipment. For example, the output unit 15 may output layout information of equipment such as illustrated in FIG. 3 to a display. Then, one piece of equipment may be specified by an input of selecting a displayed area of the one piece of equipment in the layout information. Otherwise, identification information of a piece of equipment may be directly input or selectively input via any user interface (UI) component.

Other configurations of the processing apparatus 10 are similar to those in the first and second example embodiments.

According to the processing apparatus 10 according to the present example embodiment described above, an advantageous effect similar to that of the first and second example embodiments is achieved. Further, according to the processing apparatus 10 according to the present example embodiment, information can be provided in a distinctive method, based on information (see FIG. 8) generated by the determination unit 12.

Specifically, upon receiving, from a user, an input of specifying one piece of equipment as a viewing target, the processing apparatus 10 can determine, based on the information generated by the determination unit 12, a camera that generates images including the specified piece of the equipment, and output the images by the determined camera, while switching the images one by one in sequence. Such a display method allows a user to check a piece of the equipment that the user wants to check, based on the images generated by the plurality of cameras. Further, since an image that does not include a piece of the equipment that a user wants to check is not displayed, the user can perform check work efficiently and without a wasting time.

Fourth Example Embodiment

A processing apparatus 10 according to the present example embodiment executes various types of processing, based on a database generated by the processing apparatus 10 according to the second example embodiment. FIG. 9 illustrates one example of a function block diagram of the processing apparatus 10 according to the present example embodiment.

An output unit 15 determines, based on a result of determination by a determination unit 12 (see FIG. 8), a piece of equipment that is not included in an image generated by any camera among pieces of equipment included in layout information, and outputs a result of the determination. The output is achieved via various types of output apparatuses such as a display, a printer, a mailer, and the like.

Other configurations of the processing apparatus 10 are similar to those in the first to third example embodiments.

According to the processing apparatus 10 according to the present example embodiment described above, an advantageous effect similar to that of the first to third example embodiments is achieved. Further, according to the processing apparatus 10 according to the present example embodiment, it is possible to determine, based on a result of determination by the determination unit 12 (see FIG. 8), a piece of equipment that is not included in an image generated by any camera among pieces of equipment included in layout information, and to output a result of the determination. Based on the output result, a user can recognize a piece of equipment that is left out of a target of surveillance based on an image generated by a camera.

Fifth Example Embodiment

A processing apparatus 10 according to the present example embodiment detects, by surveillance based on an image generated by a camera (a surveillance camera and the like) installed in a management target, a predetermined event (stockout, presence of a foreign object, and the like), and determines, based on a result of determination by a determination unit 12, at which piece of equipment the event occurs.

Figure 10:
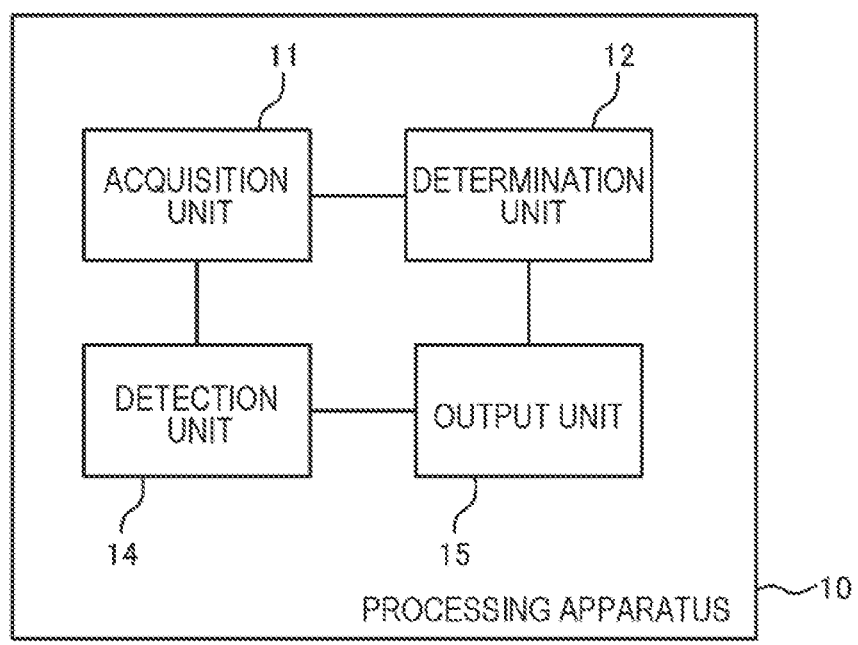
FIG. 10 is one example of a function block diagram of the processing apparatus according to the present example embodiment.
Figure 11:
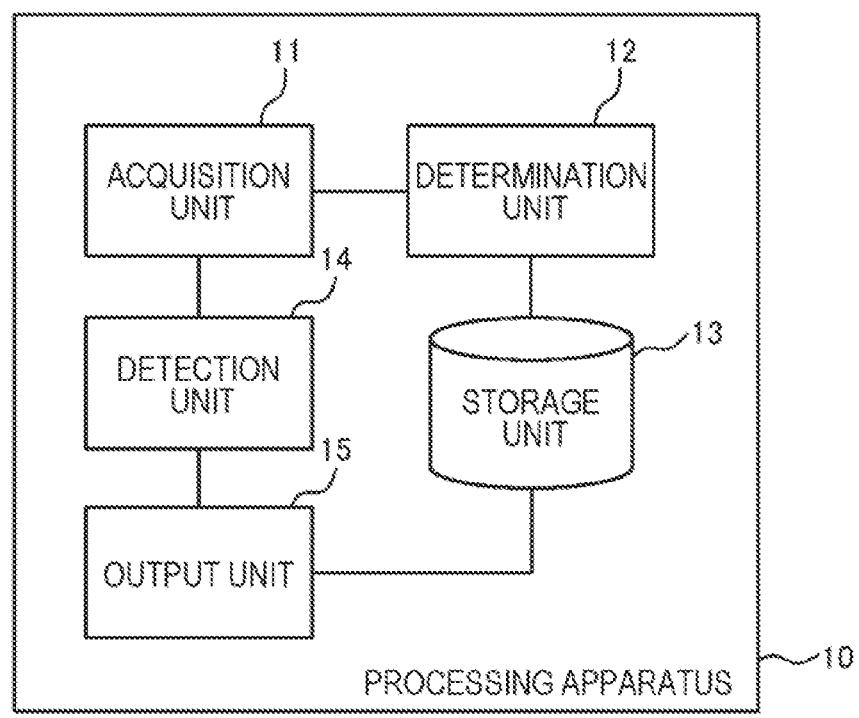
FIG. 11 is one example of a function block diagram of the processing apparatus according to the present example embodiment.

One example of a function block diagram of the processing apparatus 10 according to the present example embodiment is illustrated in FIG. 10. As illustrated, the processing apparatus 10 includes an acquisition unit 11, the determination unit 12, a detection unit 14, and an output unit 15. Note that, as illustrated in FIG. 11, processing apparatus 10 may further include a storage unit 13.

The detection unit 14 detects a predetermined event, based on an image of a management target. For example, the detection unit 14 may detect at least either of presence of a foreign object and stockout. Further, the detection unit 14 may detect another event.

Although a method of detecting a foreign object by using an image analysis is not particularly limited, one example is described below. For example, color information of equipment may be registered in advance. Further, when a color being different from a color of each piece of the equipment is present in a location (an occupied area) of each piece of the equipment in an image, the detection unit 14 may detect that as a foreign object. Further, a feature value of appearance of an object being not a foreign object, specifically, an object (in the following, a "permitted object") being permitted to be present in that location may be registered for each piece of the equipment in advance. The permitted object is, for example, a product displayed on a product shelf, and the like. Further, when an area where a color being different from a color of each piece of the equipment is present is detected, the detection unit 14 may judge, by using the information, whether the permitted object is present in the area. Further, when it is judged that the permitted object is not present, the detection unit 14 may detect that as a foreign object. Note that, the detection unit 14 can recognize, based on a result of determination by the determination unit 12, a piece of equipment included in an image generated by each camera and a location (an occupied area) of each piece of the equipment in the image.

Further, a lower limit value of a size detected as a foreign object may be defined in advance for each piece of equipment. Further, the detection unit 14 may detect an object of which size is equal to or larger than the lower limit value as a foreign object. There are various techniques of estimating a size of an object detected in an image. For example, an actual size (a width, a height, a depth, and the like) of each piece of the equipment may be registered in layout information such as illustrated in FIG. 3. Further, the detection unit 14 may estimate an actual size of a foreign object by performing arithmetic operation using a ratio based on a size-in-image of a foreign object candidate detected in the image, a size-in-image of any piece of equipment in the image, and an actual size of the piece of equipment indicated by the layout information.

Although a method of detecting stockout by using an image analysis is not particularly limited, one example is described below. For example, color information of a shelf board of a product shelf on which a product is displayed may be registered in advance. Further, the detection unit 14 may judge whether stockout is present, based on a size of an area where the same color as a color of each product shelf is present (an area where the shelf board is exposed) in a location (an occupied area) of each product shelf in an image. A product shelf part is less exposed due to presence of a product when a stockout status is not present, whereas the product shelf part is more exposed when a stockout status is present. Therefore, it is possible to judge a status of stockout, based on a size of an area where the same color as a color of each product shelf in the image is present (an area where the shelf board is exposed). For example, the detection unit 14 may judge that stockout is present when a size of the area is equal to or larger than a reference, and that stockout is not present when the size of the area is smaller than the reference.

When a predetermined event is detected in a location of a piece of equipment in an image, the output unit 15 outputs a result of the detection and information for identifying a piece of the equipment in association with each other. The output is achieved via various types of output apparatuses such as a display, a printer, a mailer, and the like. For example, the information may be output to a display included in an apparatus (a point of sale (POS) register, an apparatus installed in a backyard, and the like) installed in a store. Otherwise, a contact address (an email address and the like) of a store manager or owner of a store may be registered in advance. Further, the information may be transmitted to the contact address.

Other configurations of the processing apparatus 10 are similar to those in the first to fourth example embodiments.

According to the processing apparatus 10 according to the present example embodiment described above, an advantageous effect similar to that of the first to fourth example embodiments is achieved. Further, according to the processing apparatus 10 according to the present example embodiment, it is possible to detect, by performing surveillance based on an image generated by a camera (a surveillance camera and the like) installed in a management target, a predetermined event (stockout, presence of a foreign object, and the like), as well as to determine, based on a result of detection by the determination unit 12, at which piece of equipment the event occurs. Further, the processing apparatus 10 can determine, based on a result of determination by the determination unit 12, a location of a piece of equipment in the image, and detect various types of events by using a result of the determination.

According to the processing apparatus 10 in such a manner, a user can recognize at which piece of equipment the detected event occurs. Further, since the processing apparatus 10 can determine a piece of the equipment included in the image and a location of the piece of the equipment in the image and further perform processing of detecting various types of events, a range of a detection algorithm is expanded (for example, use of color information of each product shelf, use of information indicating a product displayed on each product shelf, and the like), and therefore an improvement in detection accuracy, and the like are expected.

An example of a referential form is supplementarily described below.

1. A processing apparatus including:
   an acquisition unit that acquires an image of a management target; and
   a determination unit that determines, by using layout information of equipment in the management target, a piece of the equipment included in the image.

2. The processing apparatus according to supplementary note 1, wherein
   the determination unit causes a storage unit to store information for identifying the piece of the equipment being determined to be included in the image and information indicating a location of the piece of the equipment in the image, in association with each other.

3. The processing apparatus according to supplementary note 1 or 2, further including:
   a detection unit that detects a predetermined event, based on the image; and
   an output unit that outputs, when the predetermined event is detected in a location of the piece of the equipment in the image, a detection result and information for identifying the piece of the equipment, in association with each other.

4. The processing apparatus according to any one of supplementary notes 1 to 3, wherein
   the determination unit determines, based on a determination result of the piece of the equipment included in the image, which area of the management target is included in the image.

5. The processing apparatus according to supplementary note 4, wherein
   the determination unit causes a storage unit to store information for identifying a camera that generates the image and information indicating a partial area of the management target included in the image, in association with each other.

6. The processing apparatus according to supplementary note 4 or 5, further including:
   a detection unit that detects a predetermined event, based on the image; and
   an output unit that outputs, when the predetermined event is detected, a detection result and information indicating a partial area of the management target included in the image, in association with each other.

7. The processing apparatus according to any one of supplementary notes 1 to 6, wherein
   the acquisition unit acquires the image generated by each of a plurality of cameras, and
   the determination unit determines which piece of the equipment is included in the image generated by each of a plurality of cameras.

8. The processing apparatus according to supplementary note 7, wherein
   the determination unit determines which area of the management target is included in the image generated by each of a plurality of cameras.

9. A processing method including,
   by a computer:
   acquiring an image of a management target; and
   determining, by using layout information of equipment in the management target, a piece of the equipment included in the image.

10. A program causing a computer to function as:
    an acquisition unit that acquires an image of a management target; and
    a determination unit that determines, by using layout information of equipment in the management target, a piece of the equipment included in the image.

While the invention of the present application has been described with reference to the example embodiments (and examples), the invention of the present application is not limited to the above-described example embodiments (and examples). Various modifications that can be understood by a person skilled in the art may be made in configuration and details of the invention of the present application within the scope of the invention of the present application.

REFERENCE SIGNS LIST

1A Processor
2A Memory
3A Input/output I/F
4A Peripheral circuit
5A Bus
10 Processing apparatus
11 Acquisition unit
12 Determination unit
13 Storage unit
14 Detection unit
15 Output unit
C1 to C9 Camera
M1 to M18 Marker

What is claimed is:
1. A processing apparatus comprising:
   at least one memory storing one or more instructions; and
   at least one processor configured to execute the one or more instructions to:
   acquire an image of a management target, the image including an object;
   determine, based on layout information indicating locations of plurality of pieces of equipment installed in the management target and indicating a location of a marker installed in the management target, to which of the plurality of pieces of equipment the object included in the image is equivalent.

2. The processing apparatus according to claim 1, wherein the processor is further configured to execute the one or more instructions to cause a storage to store information for identifying the piece of equipment to which the object included in the image is equivalent and information indicating a location in the image of the piece of equipment to which the object is equivalent, in association with each other.

3. The processing apparatus according to claim 1, wherein the processor is further configured to execute the one or more instructions to:
   detect a predetermined event, based on the image; and
   output, when the predetermined event is detected in a location in the image of the piece of equipment to which the object is equivalent, a detection result and information for identifying the piece of the equipment to which the object is equivalent, in association with each other.

4. The processing apparatus according to claim 1, wherein the processor is further configured to execute the one or more instructions to determine, based on a determination result of the piece of the equipment to which the object included in the image is equivalent, which area of the management target is included in the image.

5. The processing apparatus according to claim 4, wherein
the processor is further configured to execute the one or more instructions to cause a storage to store information for identifying a camera that generates the image and information indicating a partial area of the management target included in the image, in association with each other.

6. The processing apparatus according to claim 4, wherein the processor is further configured to execute the one or more instructions to:

detect a predetermined event, based on the image; and output, when the predetermined event is detected, a detection result and information indicating a partial area of the management target included in the image, in association with each other.

7. The processing apparatus according to claim 1, wherein the processor is further configured to execute the one or more instructions to:

acquire the image generated by each of a plurality of cameras, and determine to which of the plurality of pieces of equipment the object included in the image generated by each of the plurality of cameras is equivalent.

8. The processing apparatus according to claim 7, wherein the processor is further configured to execute the one or more instructions to determine which area of the management target is included in the image generated by each of the plurality of cameras.

9. A processing method performed by a computer and comprising:

acquiring an image of a management target, the image including an object;

determining, based on layout information indicating locations of plurality of pieces of equipment installed in the management target and indicating a location of a marker installed in the management target, to which of the plurality of pieces of equipment the object included in the image is equivalent.

10. A non-transitory storage medium storing a program causing a computer to:

acquire an image of a management target, the image including an object;

determine, based on layout information indicating locations of plurality of pieces of equipment installed in the management target and indicating a location of a marker installed in the management target, to which of the plurality of pieces of equipment the object included in the image is equivalent.

* * * * *